US006072290A

United States Patent [19]

Takagi et al.

[11] Patent Number: 6,072,290

[45] Date of Patent: Jun. 6, 2000

[54] WATERPROOF POWER WINDOW DEVICE

[75] Inventors: Isao Takagi; Akira Sasaki, both of Miyagi-ken, Japan

[73] Assignee: Alps Electric Co., Ltd., Tokyo, Japan

[21] Appl. No.: 09/205,844

[22] Filed: Dec. 4, 1998

[30] Foreign Application Priority Data

| | | | |
|---|---|---|---|
| Dec. 5, 1997 | [JP] | Japan | 9-335728 |
| Dec. 5, 1997 | [JP] | Japan | 9-335729 |

[51] Int. Cl.$^{7}$ ..... H02D 1/00

[52] U.S. Cl. ..... 318/283; 318/446

[58] Field of Search ..... 318/280–300, 318/445–489; 49/26, 28, 31

[56] References Cited

U.S. PATENT DOCUMENTS

| | | | |
|---|---|---|---|
| 4,328,451 | 5/1982 | Barge . | |
| 4,562,387 | 12/1985 | Lehnhoff . | |
| 4,575,662 | 3/1986 | Lehnhoff . | |
| 4,678,975 | 7/1987 | Vrabel et al. . | |
| 4,683,975 | 8/1987 | Booth et al. . | |
| 4,908,554 | 3/1990 | Chance | 318/286 |
| 5,547,208 | 8/1996 | Chappell et al. | 180/281 |

FOREIGN PATENT DOCUMENTS

| | | |
|---|---|---|
| 296 17 425 U 1 | 1/1997 | Germany . |
| 07230736 | 8/1995 | Japan . |
| 08203399 | 8/1996 | Japan . |

*Primary Examiner*—David Martin
*Attorney, Agent, or Firm*—Brinks Hofer Gilson & Lione

[57] ABSTRACT

When a window lowering switch is operated, a car voltage is supplied to a window lowering relay to drive the window lowering relay, and the window lowering relay is inhibited from being driven by supplying an inverse voltage to a window elevating relay. Thus, there is provided a waterproof power window device in which a window may be opened by operating the window lowering switch (3) even when a car falls in the water and is laid under water.

6 Claims, 7 Drawing Sheets

WATERPROOF POWER WINDOW DEVICE

BACKROUND OF THE INVENTION

1. Field of the Invention

The present invention relates to a waterproof power window device, and particularly to a waterproof power window device in which a door window may be opened by operating a window lowering switch even when a car falls in the water by some cause.

2. Description of the Prior Art

In general, when a car falls in the water, a power window device for used with a car is under water and a window elevating switch and a window lower switch are also underwater. As a result, even though respective contacts of the window elevating switch and the window lowering switch are opened, these contacts are electrically conducted by the water. Thus, even when the window lowering switch is operated, a window cannot be lowered, i.e. window cannot be opened.

FIG. 7 is a circuit diagram showing an example of a circuit arrangement of a main portion of a well-known power window device.

As shown in FIG. 7, a power window device comprises a window elevating switch 21, a window elevating relay 22, its contact $\mathbf{22}_1$, a window lowering switch 23, a window lowering relay 24, its contact $\mathbf{24}_1$, an automatic window elevating switch 25, an automatic window lowering switch 26, a window opening and closing motor 27, a control integrated circuit (IC) 28 and a car power supply (battery) 29.

The window elevating switch 21 and the window elevating relay 22 are connected in series between the car power supply 29 and the ground, and the window lowering switch 23 and the window lowering relay 24 are connected in parallel with the window elevating relay 22 and the window elevating switch 21. A junction a between the window elevating switch 21 and the window elevating relay 22 is connected to terminals A, D, and a junction b between the window lowering switch 23 and the window lowering relay 24 is connected to terminals B, E of the control integrated circuit 28. The automatic window elevating switch 25 has one end connected to the junction a and the other end connected to a terminal C of the control integrated circuit 28. The automatic window lowering switch 26 has one end connected to the junction b and the other end connected to the terminal C of the control integrated circuit 28. The contact $\mathbf{22}_1$ of the window elevating relay 22 has a movable contact connected to one end of a window opening and closing motor 27, one fixed contact connected to a car power supply 29 and the other fixed contact connected to the ground. The contact $\mathbf{24}_1$ of the window lowering relay 24 has a movable contact connected to the other end of the window opening and closing motor 27, one fixed contact connected to the car power supply 29 and the other fixed contact connected to the ground. A contact F of the control integrated circuit 28 is connected to the car power supply 29.

The power window device thus arranged is operated as follows:

When a car driver or the like operates the window elevating switch 21, its contact is closed and the window elevating relay 22 is driven by the car power supply 29. At that time, the contact $\mathbf{22}_1$ of the window elevating relay 22 is switched and the window opening and closing motor 27 is rotated in one direction, whereby a window is moved in the elevating direction (window closing direction). Then, when the operation of the window elevating switch 21 is stopped, its contact is opened to stop the driving of the window elevating relay 22 so that the rotation of the window opening and closing motor 27 is stopped and that the elevation of the window also is stopped. On the other hand, when the window lowering switch 23 is operated, its contact is closed and the window lowering relay 24 is driven by the car power supply 29. At that time, the contact $\mathbf{24}_1$ of the window lowering relay 24 is switched and the window opening and closing motor 27 is rotated in the other direction, whereby the window is moved in the lowering direction (window opening direction). Then, when the operation of the window lowering switch 23 is stopped, its contact is opened to stop the driving of the window lowering relay 24 so that the rotation of the window opening and closing motor 27 also is stopped and that the lowering of the window also is stopped.

When the car driver or the like operates the automatic window elevating switch 25, its contact is closed and the window elevating switch 21 is operated simultaneously, thereby resulting in its contact being closed. When the contact of this window elevating switch 21 is closed, the window elevating relay 22 is driven by the car power supply 29. Thus, similarly to case in which the aforementioned window elevating switch 21 is operated, the window opening and closing motor 27 is rotated in one direction, whereby the window is moved in the elevating direction (window closing direction).

In the above-mentioned well-known power window device, when a car falls in the water by some cause and the window elevating switch 21 and the window lowering switch 23 are laid under the water, leakage resistors 21R, 23R having relatively small resistance values are connected to a junction between the switches 21 and 23 by water. Therefore, even though the contacts of the window elevating switch 21 and the window lowering switch 23 are opened, an output voltage of the car power supply 29 is applied through these leakage resistors 21R, 23R to the window elevating relay 22 and the window lowering relay 24, whereby the window elevating relay 22 and the window lowering 24 are driven simultaneously or one of them is driven freely and unstably. Under the condition that the window elevating relay 22 and the window lowering relay 24 are driven simultaneously, even when the car driver or the like operates the window lowering switch 23 in order to open the window, the window opening and closing motor 27 is not rotated so that the window cannot be opened. This is also true when the window lowering switch 23 is operated under the condition that the window elevating relay 22 is driven freely.

As described above, the well-known power window device has the problem that a normal window operation cannot be executed when a car falls in the water and is laid under the water.

SUMMARY OF THE INVENTION

In view of the aforesaid aspect, it is an object of the present invention to provide a waterproof power window device in which a window may be opened by operating a window operation switch even when a car falls in the water and is laid under the water.

In order to attain the above-described object, in the waterproof power window device according to the present invention, a first switch (window elevating switch) and a second switch (window lowering switch) are comprised of a one-circuit two-contact switch and a fixed contact switched when the second switch is not operated is connected to the ground so that the second switch may be protected from being affected by a leakage between the contacts due to the water. At the same time, the second relay is energized by the second switch and the first relay is de-energized by an inverse voltage so that only the second relay may be driven reliably.

Also, in order to attain the aforementioned object, the waterproof power window device according to the present invention comprises a first series circuit comprised of a first switch (window elevating switch) formed of a one-circuit two-contact switch and a first relay (window elevating relay) and a second series circuit comprised of a second switch (window lowering switch) formed of a one-circuit two-contact switch and a second relay (window lowering relay). In the first series circuit, a fixed contact switched when the first switch is not operated is connected to a junction between the second switch and the second relay, a fixed contact switched when the first switch is operated is connected to a car power supply and the other end of the first relay is connected to a junction between the second switch and the second relay. In the second series circuit, a fixed contact switched when the second switch is operated is connected to the ground, a fixed contact switched when the second switch is operated is connected to the car power supply, and the other end of the second relay is connected to the ground. Then, when a car falls in the water and is laid under the water, if the first switch is leaked, a voltage of the car power supply is applied to both of the first relay and the second relay to place the motor in the stationary state. Then, when the second switch is operated, the second relay is energized and the first relay is de-energized with application of an inverse voltage so that only the second relay may be driven reliably.

According to the above-mentioned means, even when the car falls in the water and the first switch (window elevating switch) and/or the second switch (window lowering switch) is laid in the water so that an electrical insulation between the contacts is deteriorated, the second relay is driven by operating the second switch (window lowering switch) to rotate the motor, thereby making it possible to lower the window. Therefore, it is possible to prevent a driver or the like from being kept in the flooded car.

According to a first aspect of the present invention, there is provided a waterproof power window device which comprises a first series circuit one end of which is connected to a car power supply and which is comprised of a first switch and a first relay, and a second series circuit one end of which is connected to the car power supply and which is comprised of a second switch and a second relay, wherein when the first switch is operated, the first relay is energized to switch its contact to rotate a motor in one direction to elevate a window and when the second switch is operated, the second relay is energized to switch its contact to rotate the motor in the other direction to lower the window, the other end of the first series circuit is connected to a junction between the second switch and the second relay, the other end of the second series circuit is connected to a junction between the first switch and the first relay, the first switch and the second switch are each comprised of a one-circuit two-contact switch in which a fixed contact switched upon non-operation is connected to the ground and a fixed contact switched upon operation is connected to the car power supply.

According to a second aspect of the present invention, there is provided a waterproof, power window device, wherein an automatic first switch operable in unison with the first switch upon operation and an automatic second switch operable in unison with the second switch upon operation are connected in parallel to the car power supply and a control integrated circuit, after the automatic first switch is operated, the control integrated circuit generates a voltage, the first relay is energized by the voltage to rotate the motor in one direction to elevate a window and after the automatic second switch is operated, the control integrated circuit generates a voltage, the second relay is energized by the voltage to rotate the motor in the other direction to lower the window.

According to a third aspect of the present invention, there is provided a waterproof power window device which is comprised of a first series circuit one end of which is connected to a car power supply and which is comprised of a first switch and a first relay, and a second series circuit one end of which is connected to the car power supply and which is comprised of a second switch and a second relay, wherein when the first switch is operated, the second relay is energized to switch its contact to rotate a motor in one direction to elevate a window and when the second switch is operated, the first relay is energized to switch its contact to rotate the motor in the other direction to lower the window, the other end of the first series circuit is connected to a junction between the second switch and the second relay, the other end of the second series circuit is connected to a junction between the first switch and the first relay, the first switch and the second switch are each comprised of a one-circuit two-contact switch in which a fixed contact switched upon non-operation is connected to the car power supply and a fixed contact switched upon operation is connected to the ground.

According to a fourth aspect of the present invention, in a waterproof power window device, an automatic first switch operable in unison with the first switch upon operation and an automatic second switch operable in unison with the second switch upon operation are connected in parallel to the car power supply and a control integrated circuit, after the automatic first switch is operated, the control integrated circuit generates a voltage, the first relay is energized by the voltage to rotate the motor in one direction to elevate a window and after the automatic second switch is operated, the control integrated circuit generates a voltage, the second relay is energized by the voltage to rotate the motor in the other direction to lower the window.

According to a fifth aspect of the present invention, there is provided a waterproof power window device which comprises a first series circuit comprised of a first switch formed of a one-circuit two-contact switch and a first relay, and a second series circuit comprised of a second switch formed of a one-circuit two-contact switch and a second relay, wherein the first series circuit connects a fixed contact switched when the first switch is not operated to a junction between the second switch and the second relay and a fixed contact switched when the first switch is operated to a car power supply, the other end of the first relay is connected to a junction between the second switch and the second relay, the second series circuit connects a fixed contact switched when the second switch is not operated to the ground and a fixed contact switched when the second switch is operated to the car power supply, the other end of the second relay is connected to the ground, when the first switch is operated, the first relay is energized to switch its contact to rotate a motor in one direction to elevate a window and when the second switch is operated, the second relay is energized to switch its contact to rotate the motor in the other direction to lower the window.

According to a sixth aspect of the present invention, there is provided a waterproof power window device, wherein an automatic first switch operable in unison with the first switch and an automatic second switch operable in unison with the second switch are connected in parallel to the car power supply and a control integrated circuit, after the automatic first switch is operated, the control integrated circuit generates a voltage, the first relay is energized by the voltage to rotate the motor in one direction to elevate a window and after the automatic second switch is operated, the control integrated circuit generates a voltage, the second relay is energized by the voltage to rotate the motor in the other direction to lower the window.

In accordance with these aspects of the present invention, even though the car falls in and flooded by the water, at the same time the second relay is energized by operating the second switch (window lowering switch), the first relay is de-energized by the inverse voltage. Thus, the motor may be rotated only by the second relay in the window opening direction. Therefore, it is possible to avoid an accident in which a car driver or the like is kept in flooded car.

DESCRIPTION OF THE PREFERRED EMBODIMENTS

The present invention will hereinafter be described with reference to the drawings.

Figure 1:
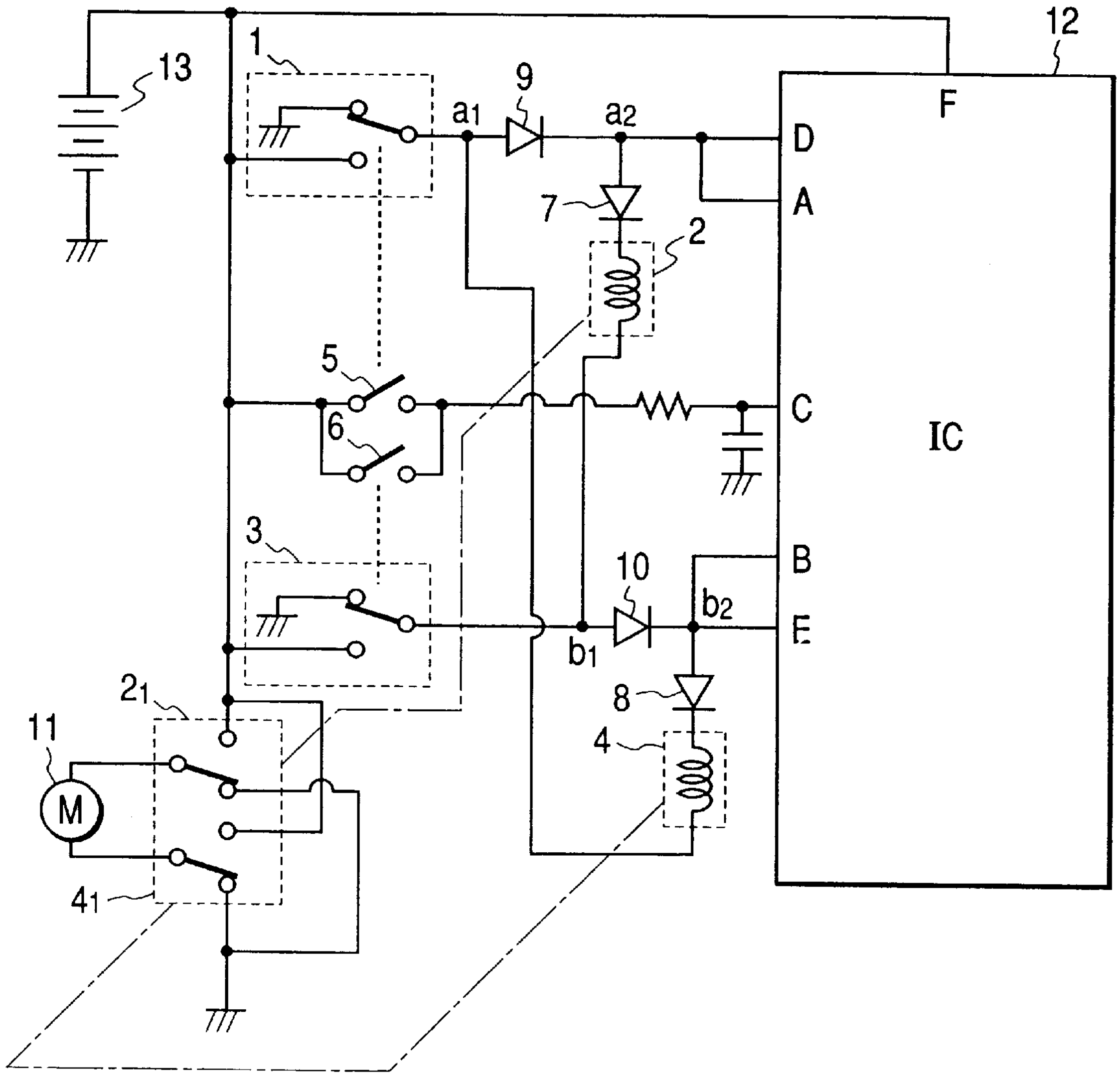
FIG. 1 is a circuit diagram showing a main portion of a waterproof power window device according to a first embodiment of the present invention.

FIG. 1 of the accompanying drawings is a circuit diagram showing a main portion of a waterproof power window device according to a first embodiment.

As shown in FIG. 1, this waterproof power window device comprises a window elevating switch (first switch) 1 comprised of a one-circuit two-contact switch, a window lowering switch (second switch) 3 comprised of a window elevating relay 2, its contact $\mathbf{2}_1$ and a one-circuit two-contact switch, a window lowering relay 4, its contact $\mathbf{4}_1$, an automatic window elevating switch 5, an automatic window lowering switch 6, a first reverse current protection diode 7, a second reverse current protection diode 8, a third reverse current protection diode 9, a fourth reverse current protection diode 10, a window opening and closing motor 11, a control integrated circuit (IC) 12 and a car power supply (battery) 13.

A movable contact of the window elevating switch 1, the third reverse current protection diode 9, the first reverse current protection diode 7 and the window elevating relay 2 are connected in series to form a first series circuit. A movable contact of the window lowering switch 3, the fourth reverse current protection diode 10, the second reverse current protection diode 8 and the window lowering relay 4 are connected in series to form a second series circuit. In the first series circuit, the window elevating switch 1 has one fixed contact (normally-close contact) connected to the ground and the other fixed contact (normally-open contact) connected to the positive polarity side of the car power supply 13. In the window elevating relay 2, the other end of the first series circuit is connected to a junction $b_1$ between the movable contact of the window lowering switch 3 and the fourth reverse current protection diode 10. In the second series circuit, the window lowering switch 3 has one fixed contact (normally-open contact) connected to the ground and the other fixed contact (normally-open contact) connected to the positive polarity side of the car power supply 13. In the window lowering relay 4, the other end of the second series circuit is connected to a junction $a_1$ between the movable contact of the window lowering switch 3 and the third reverse current protection diode 9. A junction $a_2$ between the third reverse current protection diode 9 and the first reverse current protection diode 7 is connected to ports A and D of the control integrated circuit 12. A junction $b_2$ between the fourth reverse current protection diode 10 and the second reverse current protection diode 8 is connected to ports B and E of the control integrated circuit 12.

In the automatic window elevating switch 5, the movable contact is connected to the positive polarity side of the car power supply 13, and the fixed contact is connected to the port C of the control integrated circuit 12. In the automatic window lowering switch 6, the movable contact is connected to the positive polarity side of the car power supply 13, and the fixed contact is connected to the port C of the control integrated circuit 12. In the contact $\mathbf{2}_1$ of the window elevating relay 2, the movable contact is connected to one end of the window opening and closing motor 11, one fixed contact is connected to the positive polarity side of the car power supply 13 and the other fixed contact is connected to the ground. In the contact $\mathbf{4}_1$ of the window lowering relay 4, the movable contact is connected to the other end of the window opening and closing motor 11, one fixed contact is connected to the positive polarity side of the car power supply 13, and the other fixed contact is connected to the ground. In the car power supply 13, the positive polarity side is connected to the port F of the control integrated circuit 12, and the negative polarity side is connected to the ground.

Further, in the waterproof power window device according to the first embodiment, all assemblies except the window opening and closing motor 11 and the car power supply 13 are mounted on the printed circuit board and coated with a waterproof material, although not shown.

In this case, with respect to the window elevating switch 1, the window lowering switch 3, the automatic window elevating switch 5 and the automatic window lowering switch 6, movable members (switch operation portions) for operating the respective switches 1, 3, 5, 6 have to be led out from the bodies of the respective switches 1, 3, 5, 6 to the operable areas so that the portions from which the movable members are led out from the bodies cannot be treated by waterproof treatment. Therefore, it is difficult to avoid the bodies of the respective switches 1, 3, 5, 6 from being flooded by water when a car is flooded by water.

The waterproof power window device according to the first embodiment is operated as follows.

When a car driver or the like operates the window elevating switch 1, its movable contact is switched from the illustrated normally-close fixed contact to the normally-open fixed contact to supply the voltage of the car power supply 13 through the switched window elevating switch 1, the third reverse current protection diode 9, the first reverse current protection diode 7, the window elevating relay 2 and the window lowering switch 3 whose movable contact is switched to the illustrated normally-close fixed contact side to the ground point, thereby driving the window elevating relay 2. At that time, in the contact $2_1$ of the window elevating relay 2, the movable contact is switched from the illustrated connected state to the revere connected state to supply the voltage of the car power supply 13 to the window opening and closing motor 11, thereby resulting in the window opening and closing motor 11 being rotated in one direction. This window opening and closing motor 11 is rotated in one direction, whereby the window is elevated to close the window. Then, when the operation of the window elevating switch 1 is stopped, its movable contact is switched to the illustrated normally-close fixed contact side and the voltage of the car power supply 13 is blocked by the window elevating switch 1 to thereby stop the driving of the window elevating relay 2. Thus, the rotation of the window opening and closing motor 11 is stopped and the elevation of the window is stopped, thereby resulting in the window being held at that position.

On the other hand, when the car driver or the like operates the window lowering switch 3, its movable contact is switched from the illustrated normally-close fixed side to the normally-open fixed contact side to supply the voltage of the car power supply 13 through the switched window lowering switch 3, the fourth reverse current protection diode 10, the second reverse current protection diode 8, the window lowering relay 4 and the window elevating switch 1 whose movable contact is switched to the illustrated normally-close fixed contact side to the ground point, thereby resulting in the window lowering relay 4 being driven. At that time, in the contact 41 of the window lowering relay 4, the movable contact is switched from the illustrated connection state to the reverse connection state, whereby the voltage of the car power supply 13 is supplied to the window opening and closing motor 11, thereby resulting in the window opening and closing motor 11 being rotated in the other direction. When this window opening and closing motor 11 is rotated in the other direction, the window is lowered to open the window. Then, when the operation of the window lowering switch 3 is stopped, its movable contact is switched to the illustrated fixed contact side and the voltage of the car power supply 13 is blocked by the window lowering switch 3, whereby the driving of the window lowering relay 4 is stopped. Thus, the rotation of the window opening and closing motor 11 is stopped and the lowering of the window is stopped, thereby resulting in the window being held at that position.

Also, when the car driver or the like operates the automatic window elevating switch 5, the window elevating switch 1 also is operated in unison with the operation of the automatic window elevating switch 5, whereby the movable contact of the automatic window elevating switch 5 is closed and the movable contact of the window elevating switch 1 is switched from the illustrated normally-close fixed contact side to the normally-open fixed contact side. When the movable contact of the window elevating switch 1 is switched to the normally-open fixed contact side, the voltage of the car power supply 13 is applied through the window elevating switch 1, the third reverse current protection diode 9 and the first reverse current protection diode 7 to the window elevating relay 2, whereby the window elevating relay 2 is driven similarly to case in which the window elevating switch 1 is operated solely to rotate the window opening and closing motor 11 in one direction. When the window opening and closing motor 11 is rotated in one direction, the window is elevated to close the window. At that time, since the movable contact of the automatic window elevating switch 5 is closed, the voltage of the car power supply 13 is applied to the port C of the control integrated circuit 12, whereby the control integrated circuit 12 outputs the voltage of the car power supply 13 to the port A from which the voltage is supplied to the window elevating relay 2. Here, when the operation of the automatic window elevating switch 5 is stopped and the operation of the window elevating switch 1 which is in unison therewith also is stopped, the movable contact of the window elevating switch 1 is switched from the normally-open fixed contact side to the normally-close fixed contact side, whereby the supply of the voltage of the car power supply 13 to the window elevating relay 2 through the window elevating switch 1 is stopped. However, since the supply of the voltage of the car power supply 13 outputted from the port A of the control integrated circuit 12 is latched and the supply of the voltage of the window elevating relay 2 is still maintained, the window elevating relay 2 is continued to be driven. As a result, the window opening and closing motor 11 is continuously rotated in one direction, whereby the window is continuously elevated. The elevation of the window is continued until the window reaches the uppermost portion of the movable range and the window is fully closed. In this case, the third reverse current protection diode 9 is connected in order to apply all of the voltages of the car power supply 13 outputted from the port A of the control integrated circuit 12 to the window elevating relay 2.

Similarly, when the car driver or the like operates the automatic window lowering switch 6, the window lowering switch 3 also is simultaneously operated in unison therewith to close the movable contact of the automatic window lowering switch 6 and the movable contact of the window lowering switch 3 is switched from the illustrated normally-close fixed contact side to the normally-open fixed contact side. When the movable contact of the window lowering switch 3 is switched to the normally-open fixed contact side, the voltage of the car power supply 13 is applied through the window lowering switch 3, the fourth reverse current protection diode 10 and the second reverse current protection diode 8 to the window lowering relay 4. Similarly to the case in which the window lowering switch 3 is operated solely, the window lowering relay 4 is driven to rotate the window opening and closing motor 11 in the other direction. When the window opening and closing motor 11 is rotated in the other direction, the window is lowered to open the window. At that time, when the movable contact of the automatic window lowering switch 6 is closed, the voltage of the car power supply 13 is applied to the port C of the control integrated circuit 12, whereby the control integrated circuit 12 outputs the voltage of the car power supply 13 supplied to the port F to the port B from which the voltage is supplied to the window lowering relay 4. When the operation of the automatic window lowering switch 6 is stopped and the operation of the window lowering switch 3 which is in unison therewith also is stopped, the movable contact of the window lowering switch 3 is switched from the normally-open fixed contact side to the normally-close fixed contact side to stop the supply of the voltage of the car power supply 13 to the window lowering relay 4 through the window lowering switch 3. However, since the supply of the voltage of the car power supply 13 outputted from the port B of the control integrated circuit 12 is latched and the supply of the voltage of the car power supply 13 to the window lowering relay 4 is still maintained, the window lowering relay 4 is continued to be driven. As a result, the window opening and closing motor 11 is continuously rotated in the other direction to continuously lower the window. The lowering of the window is continued until the window reaches the lowermost portion of the movable range and the window is fully opened. In this case, the fourth reverse current protection diode 10 is connected in order to apply all of the voltages of the car power supply 13 outputted from the port B of the control integrated circuit 12 to the window lowering relay 4.

Further, under the condition that the window of the car is completely closed or nearly completely closed, if the car falls in the water due to some cause, then the waterproof power window device according to this embodiment attached to the inside of the door also is flooded by the water. In this case, although most of the assemblies of the waterproof power window device is made waterproof by a waterproof resin mold, the movable members (switch operation portions) for operating these switches of the window elevating switch 1, the window lowering switch 3, the automatic window elevating switch 5 and the automatic window lowering switch 6 are exposed to the outside, and these switches also are flooded by the water. Then, when the water enters the window elevating switch 1 and the window lowering switch 3, as mentioned before, it becomes equivalent that a leakage resistor based on water having a relatively small resistance value is connected between the movable contact and the normally-open fixed contact. However, since the normally-close fixed contacts of the window elevating switch 1 and the window lowering switch 3 are all connected to the ground, the voltage of the car power supply 13 applied to the window elevating switch 1 and the window lowering switch 3 is applied through the leakage resistor connected between the movable contact and the normally-open fixed contact and the movable contact which is switched to the normally-close fixed contact side to the ground point and is not applied to the window elevating relay 2 and the window lowering relay 4. As a result, since the contact $2_1$ of the window elevating relay 2 and the contact $4_1$ of the window lowering relay 4 are connected in the illustrated states, the window opening and closing motor 11 is not rotated.

Under such state, when the car driver or the like operates the window lowering switch 3, the contact of the window lowering switch 3 is switched from the normally-close fixed contact side to the normally-open fixed contact side to place the leakage resistor based on the water connected between the normally-open fixed contact and the movable contact in the short-circuit state by the switching of the contact. At the same time, the portion between the normally-close fixed contact side and the movable contact is changed from the short-circuit state to the opened state. Thus, this time the leakage resistor based on the water is connected to the portion between the normally-close fixed contact side and the movable contact. As a result, the voltage of the car power supply 13 is supplied through the window lowering switch 3 in the short-circuit state, the fourth reverse current protection diode 10 and the second reverse current protection diode 8 to the window lowering relay 4 to drive the window lowering relay 4. Then, when the window lowering relay 4 is driven, its contact $4_1$ is switched from the illustrated connected state to the reverse connected state, whereby the voltage of the car power supply 13 is applied to the window opening and closing motor 11, thereby resulting in the window opening and closing motor 11 being rotated in the other direction. Thus, the window is lowered to open the window, thereby making it possible for the car driver or the like to escape from the flooded car through the opened window.

When the window lowering switch 3 is operated, the voltage of the car power supply 13 is supplied to the window lowering relay 4 by the above-mentioned procedure, and at the same time, the voltage of the car power supply 13 is supplied to the lower end of the window elevating relay 2 through the junction b1. Accordingly, although the window elevating relay 2 is driven due to the short-circuit of the circuit, when the window lowering switch 3 is operated, the driving of the window elevating relay 2 is released and only the window lowering relay 4 is driven.

As described above, in the waterproof power window device according to the first embodiment, even when the car falls in the water, the waterproof power window device is flooded by the water and the water enters the window lowering switch 3, the window may be opened by operating the window lowering switch 3.

Figure 2:
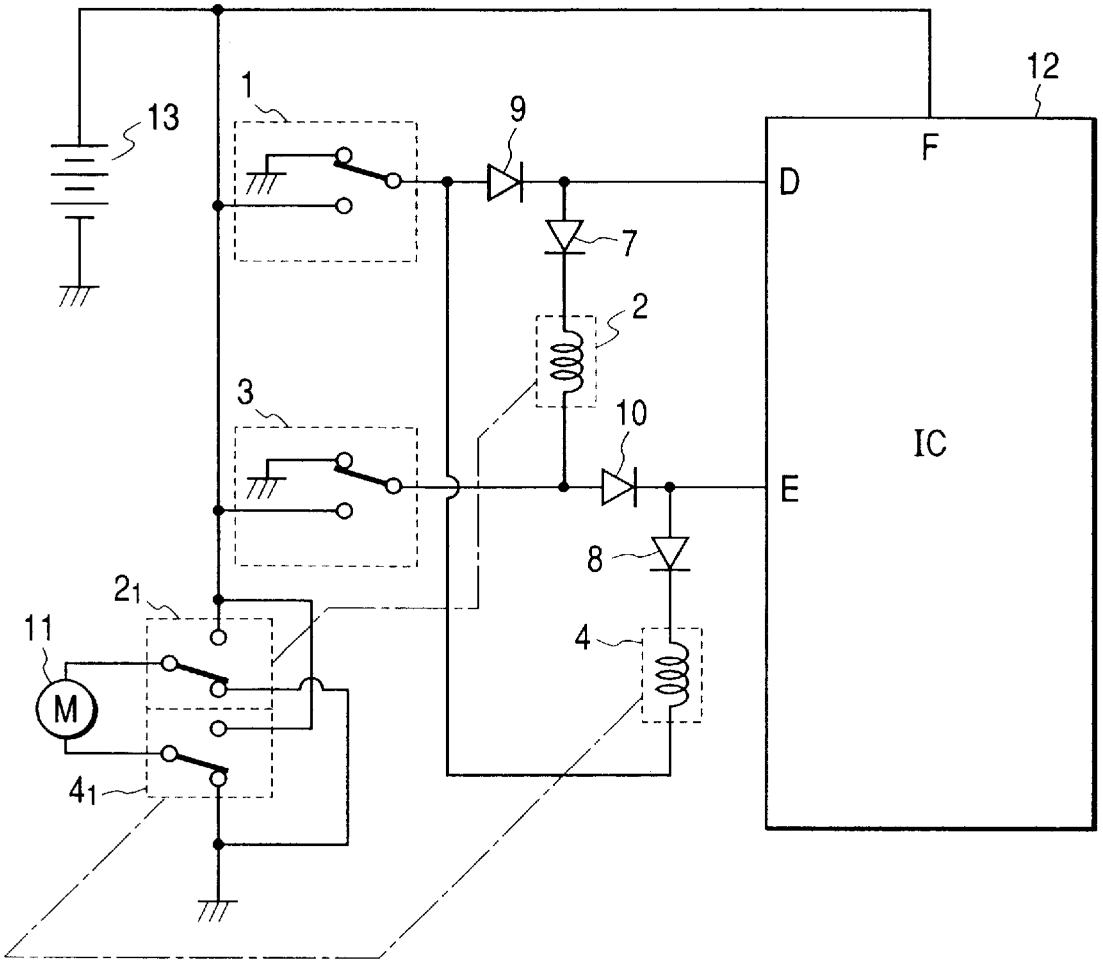
FIG. 2 is a circuit diagram showing a main portion of a waterproof power window device according to a second embodiment of the present invention.

FIG. 2 is a circuit diagram showing a main portion of a waterproof power window device according to a second embodiment of the present invention.

In FIG. 2, elements and parts identical to those of FIG. 1 are marked with the same reference numerals.

In the second embodiment, the automatic window elevating switch 5 and the automatic window lowering switch 6 are removed from the first embodiment. The second embodiment is the same as the first embodiment excepting that the automatic window elevating switch 5 and the automatic window lowering switch 6 are not connected. The arrangement of the second embodiment will not be described any more.

The operation upon normal state in the operation of the second embodiment (operation executed when the waterproof power window device is not flooded by the water) is almost the same as the operation upon normal state of the first embodiment excepting that the automatic operation using the automatic window elevating switch 5 and the automatic window lowering switch 6 cannot be executed. Therefore, the operation upon normal state in the second embodiment will not be described any more.

Further, the operation in the flooded state in the operation of the second embodiment (operation executed when the waterproof power window device is flooded by the water) is exactly the same as the operation in the flooded state in the first embodiment. In addition, action and effects achieved by the second embodiment are the same as those achieved by the first embodiment because the operation in the flooded state is the same as the operation in the first embodiment. Therefore, the operation in the flooded state of the second embodiment and the action and effects achieved by the second embodiment will not be described any more.

Figure 3:
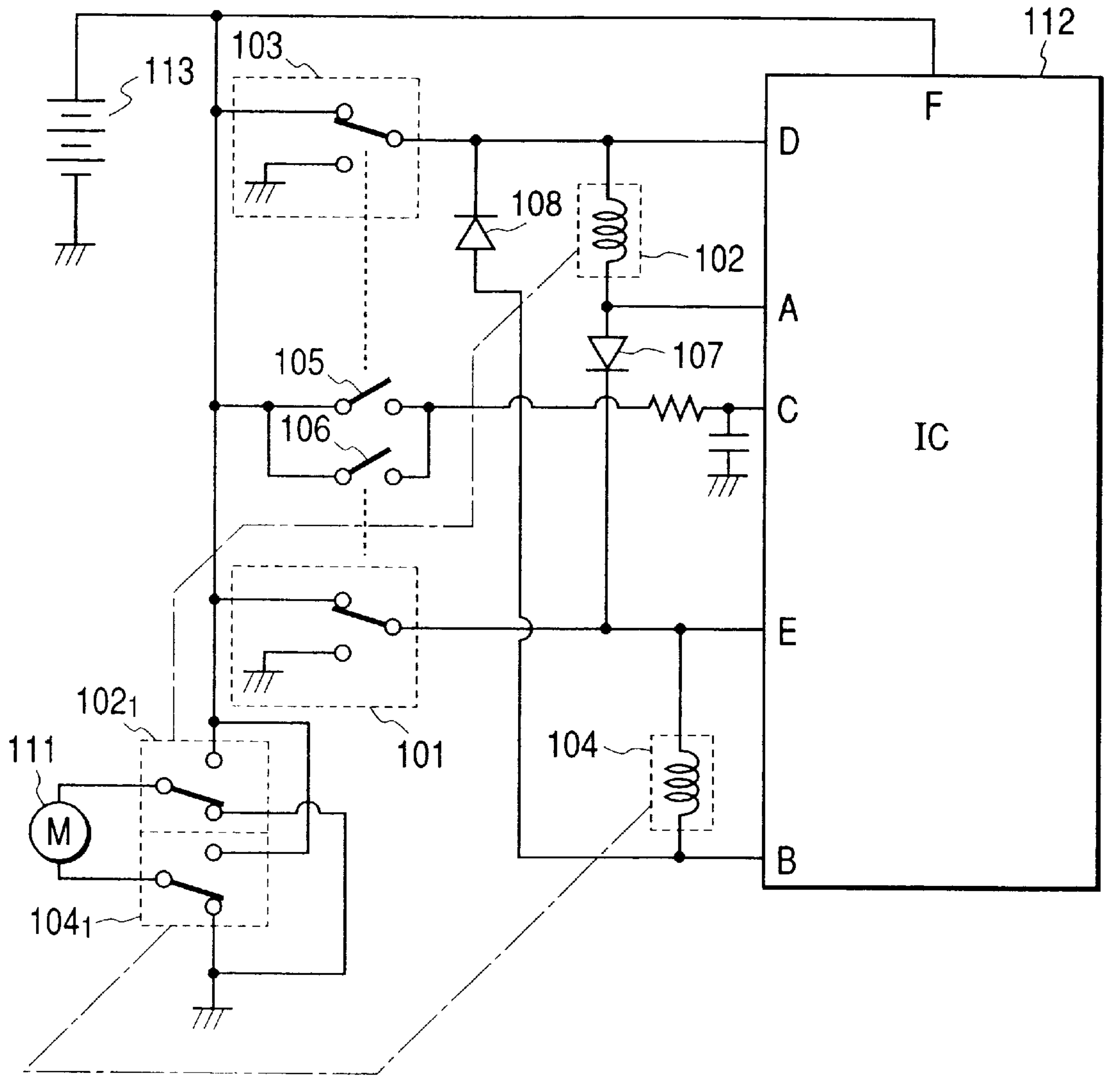
FIG. 3 is a circuit diagram showing a main portion of a waterproof power window device according to a third embodiment of the present invention.

FIG. 3 is a circuit diagram showing a main portion of a waterproof power window device according to a third embodiment of the present invention.

A difference between the third embodiment and the first embodiment will be described below. While the control integrated circuit 12 is operated in the positive logical state in the first embodiment, according to the third embodiment, a control integrated circuit 112 is operated in the negative logical state.

That is, in a one-circuit two-contact window elevating switch 101, a normally-close fixed contact is connected to a car power supply 113, a normally-open fixed contact is connected to the ground and a movable contact is directly connected to one end of a window lowering relay 104 and a port E of the control integrated circuit 112. In a one-circuit two-contact window lowering switch 103, a normally-close fixed contact is connected to the car power supply 113, a normally-open fixed contact is connected to the ground and a movable contact is directly connected to one end of the window elevating relay 102 and a port D of the control integrated circuit 112. In the first reverse current protection diode 107, the other end is directly connected to a port A of the control integrated circuit 112 and is connected through a first reverse current protection diode 107 to one end of the window lowering relay 104. In the window lowering relay 104, the other end is directly connected to a port B of the control integrated circuit 112 and is connected through a second reverse current protection diode 108 to one end of the window elevating relay 102. Then, other arrangements are similar to those of the first embodiment.

The waterproof power window device according to the third embodiment is operated as follows.

When a car driver or the like operates the window elevating switch 101, its movable contact is switched from the illustrated normally-close fixed contact to the normally-open fixed contact and the movable contact is connected to the ground. At that time, the voltage of the car power supply 113 is supplied through the window lowering switch 103 whose movable contact is switched to the illustrated normally-close fixed contact side, the window elevating relay 102, the first reverse current protection diode 107 and the window elevating switch 103 whose movable contact is switched to the illustrated normally-open fixed contact side to the ground point, thereby driving the window elevating relay 102. At that time, in the contact $102_1$ of the window elevating relay 102, the movable contact is switched from the illustrated connected state to the revere connected state to supply the voltage of the car power supply 113 to the window opening and closing motor 111, thereby resulting in the window opening and closing motor 111 being rotated in one direction. This window opening and closing motor 111 is rotated in one direction, whereby the window is elevated to close the window. Then, when the operation of the window elevating switch 101 is stopped, its movable contact is switched to the illustrated normally-close fixed contact side and the connection to the ground state is blocked by the window elevating switch 101 to thereby stop the driving of the window elevating relay 102. Thus, the rotation of the window opening and closing motor 111 is stopped and the elevation of the window is stopped, thereby resulting in the window being held at that position.

On the other hand, when the car driver or the like operates the window lowering switch 103, its movable contact is switched from the illustrated normally-close fixed contact side to the normally-open fixed contact side and the movable contact is connected to the ground. At that time, the voltage of the car power supply 113 is supplied through the window elevating switch 101 whose movable contact is switched in the illustrated normally-close fixed contact, the window lowering relay 104, a second reverse current protection diode 108 and the window lowering switch 103 whose movable contact is switched to the illustrated normally-open fixed contact side to the ground point, thereby resulting in the window lowering relay 104 being driven. At that time, in the contact $104_1$ of the window lowering relay 104, the movable contact is switched from the illustrated connection state to the reverse connection state, whereby the voltage of the car power supply 113 is supplied to the window opening and closing motor 111, thereby resulting in the window opening and closing motor 111 being rotated in the other direction. When this window opening and closing motor 111 is rotated in the other direction, the window is lowered to open the window. Then, when the operation of the window lowering switch 103 is stopped, its movable contact is switched to the illustrated normally-close fixed contact side and the connection to the ground point is blocked by the window lowering switch 103 and the driving of the window lowering relay 104 is stopped. Thus, the rotation of the window opening and closing motor 111 is stopped and the lowering of the window is stopped, thereby resulting in the window being held at that position.

Also, the operation executed when the car driver or the like operates the automatic window elevating switch 105 or when the automatic window lowering switch 106 is operated may be easily understood from the operation of the first embodiment and need not be described.

Further, under the condition that the window of the car is completely closed or nearly completely closed, if the car falls in the water due to some cause, then the waterproof power window device according to the third embodiment attached to the inside of the door also is flooded by the water. In this case, in the waterproof power window device according to the third embodiment, similarly to the first embodiment, when the window elevating switch 101 and the window lowering switch 103 are flooded by the water, it becomes equivalent that a leakage resistor based on water having a relatively small resistance value is connected between the movable contact and the normally-open fixed contact. However, since the normally-close fixed contacts of the window elevating switch 101 and the window lowering switch 103 are all connected to the car power supply 113, and the ground voltage is applied to the window elevating switch 101 and the window lowering switch 103. Thus, the voltage of the car power supply 113 is applied through the leakage resistor connected between the movable contact and the normally-open fixed contact and the movable contact which is switched to the normally-close fixed contact side to the ground point. Then, the voltage of the car power supply 113 is not applied to one end of the window elevating relay 102 and the window lowering relay 104 and the ground voltage is not applied to the other end. As a result, since the contact $102_1$ of the window elevating relay 102 and the contact $104_1$ of the window lowering relay 104 are connected in the illustrated states, the window opening and closing motor 111 is not rotated.

Under such state, when the car driver or the like operates the window lowering switch 103, the contact of the window lowering switch 103 is switched from the normally-close fixed contact side to the normally-open fixed contact side to place the leakage resistor based on the water connected between the normally-open fixed contact and the movable contact in the short-circuit state by the switching of the contact. At the same time, the portion between the normally-close fixed contact side and the movable contact is changed from the short-circuit state to the opened state. Thus, this time the leakage resistor based on the water is connected to the portion between the normally-close fixed contact side and the movable contact. As a result, the voltage of the car power supply 113 is supplied through the short-circuited window elevating switch 101, the window lowering relay 104, the second reverse current protection diode 108 and the movable contact of the window lowering switch 103 which is switched to the normally-open fixed contact side to the ground point, thereby driving the window lowering relay 104. Then, when the window lowering relay 104 is driven, its contact $104_1$ is switched from the illustrated connected state to the reverse connected state, whereby the voltage of the car power supply 113 is applied to the window opening and closing motor 111, thereby resulting in the window opening and closing motor 111 being rotated in the other direction. Thus, the window is lowered to open the window, thereby making it possible for the car driver or the like to escape from the flooded car through the opened window.

When the window lowering switch 103 is operated, the voltage of the car power supply 113 is supplied to the window lowering relay 104 by the above-mentioned procedure, and at the same time, the voltage of the car power supply 113 is supplied to the lower end of the window elevating relay 102. Accordingly, although the window elevating relay 102 is driven due to the short-circuit of the circuit, when the window lowering switch 103 is operated, the driving of the window elevating relay 102 is released and only the window lowering relay 104 is driven.

Figure 4:
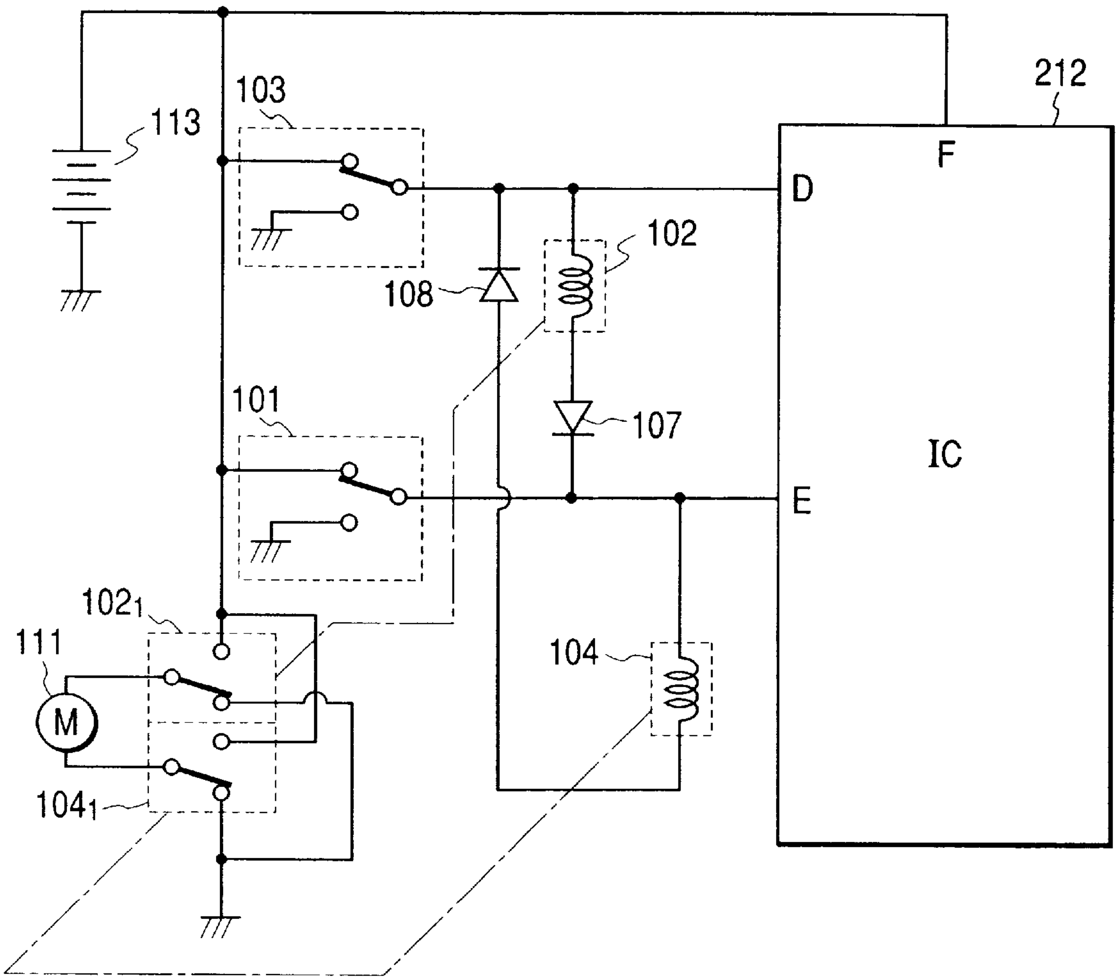
FIG. 4 is a circuit diagram showing a main portion of a waterproof power window device according to a fourth embodiment of the present invention.

FIG. 4 is a circuit diagram showing a main portion of a waterproof power window device according to a fourth embodiment of the present invention.

In FIG. 4, elements and parts identical to those of FIG. 3 are marked with the same reference numerals.

In the fourth embodiment, the automatic window elevating switch 105 and the automatic window lowering switch 106 are removed from the third embodiment. The fourth embodiment is the same as the third embodiment excepting that the automatic window elevating switch 105 and the automatic window lowering switch 106 are not connected. The arrangement of the fourth embodiment will not be described any more.

The operation upon normal state in the operation of the fourth embodiment (operation executed when the waterproof power window device is not flooded by the water) is almost the same as the operation upon normal state of the third embodiment excepting that the automatic operation using the automatic window elevating switch 105 and the automatic window lowering switch 106 cannot be executed. Therefore, the operation upon normal state in the fourth embodiment will not be described any more.

Further, the operation in the flooded state in the operation of the fourth embodiment (operation executed when the waterproof power window device is flooded by the water) is exactly the same as the operation in the flooded state in the third embodiment. In addition, action and effects achieved by the fourth embodiment are the same as those achieved by the third embodiment because the operation in the flooded state is the same as the operation in the third embodiment. Therefore, the operation in the flooded state of the fourth embodiment and the action and effects achieved by the fourth embodiment will not be described any more.

Figure 5:
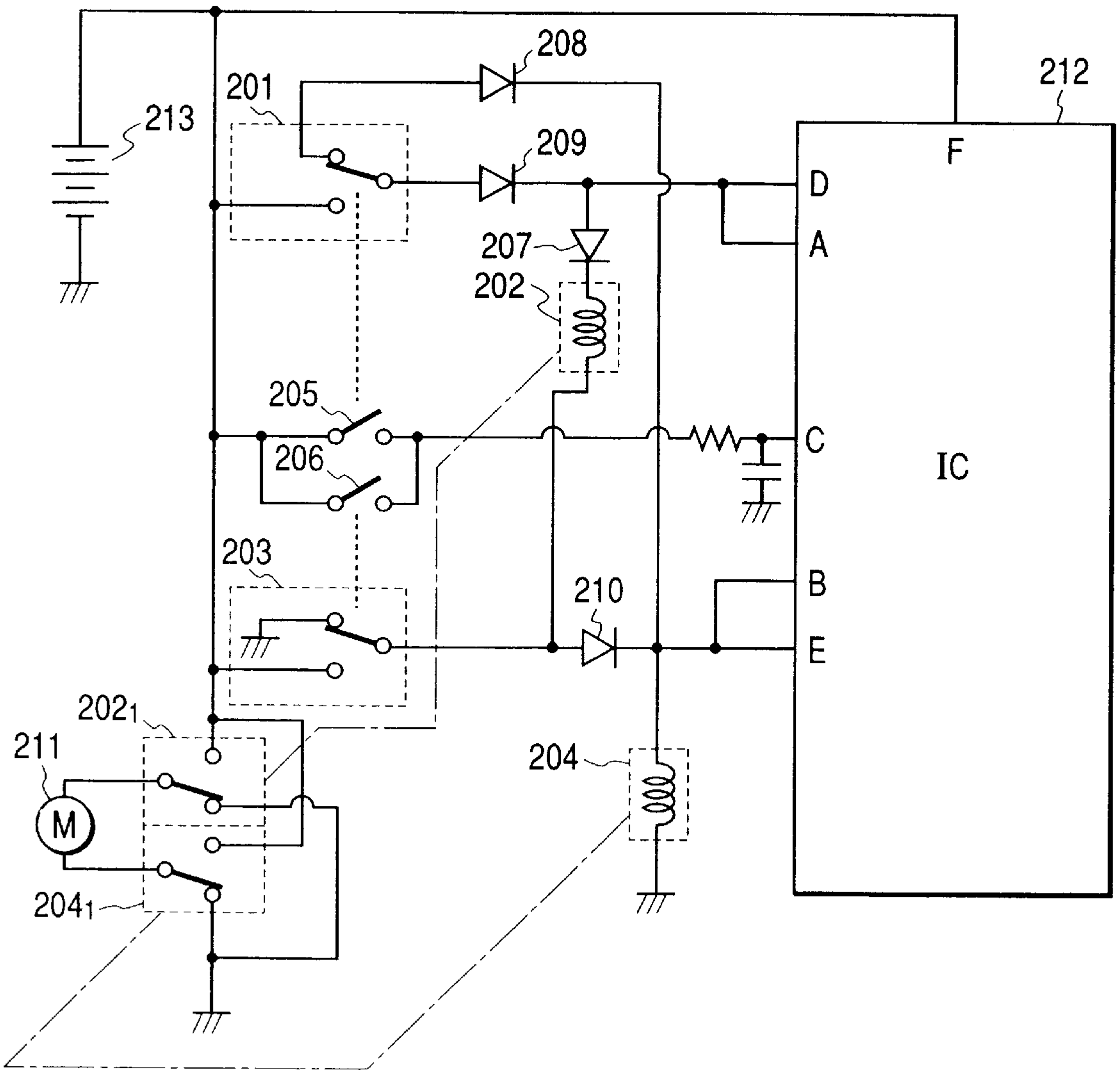
FIG. 5 is a circuit diagram showing a main portion of a waterproof power window device according to a fifth embodiment of the present invention.

FIG. 5 is a circuit diagram showing a main portion of a waterproof power window device according to a fifth embodiment of the present invention.

As shown in FIG. 5, this waterproof power window device comprises a window elevating switch (first switch) 201 comprised of a one-circuit two-contact switch, a window lowering switch (second switch) 203 comprised of a window elevating relay 202, its contact $202_1$ and a one-circuit two-contact switch, a window lowering relay 204, its contact $204_1$, an automatic window elevating switch 205, an automatic window lowering switch 206, a first reverse current protection diode 207, a second reverse current protection diode 208, a third reverse current protection diode 209, a fourth reverse current protection diode 210, a window opening and closing motor 211, a control integrated circuit (IC) 212 and a car power supply (battery) 213.

A movable contact of the window elevating switch 201, the third reverse current protection diode 209, the first reverse current protection diode 207 and the window elevating relay 202 are connected in series to form a first series circuit. A movable contact of the window lowering switch 203, the fourth reverse current protection diode 210 and the window lowering relay 204 are connected in series to form a second series circuit. In the first series circuit, the window elevating switch 201 has one fixed contact (normally-close contact) connected to a junction between the fourth reverse current protection diode 210 and the window lowering relay 204 through the second reverse current protection diode 208 and the other fixed contact (normally-open contact) connected to the positive polarity side of the car power supply 213. In the window elevating relay 202, the other end of the first series circuit is connected to a junction between the movable contact of the window lowering switch 203 and the fourth reverse current protection diode 210. In the second series circuit, the window lowering switch 203 has one fixed contact (normally-close contact) connected to the ground and the other fixed contact (normally-open contact) connected to the positive polarity side of the car power supply 213. In the window lowering relay 204, the other end is connected to the ground. A junction between the third reverse current protection diode 209 and the first reverse current protection diode 207 is connected to the ports A and D of the control integrated circuit 212, and a junction between the fourth reverse current protection diode 210 and the second reverse current protection diode 208 is connected to the ports B and E of the control integrated circuit 212.

In the automatic window elevating switch 205, the movable contact is connected to the positive polarity side of the car power supply 213, and the fixed contact is connected to the port C of the control integrated circuit 212. In the automatic window lowering switch 206, the movable contact is connected to the positive polarity side of the car power supply 213, and the fixed contact is connected to the port C of the control integrated circuit 212. In the contact $202_1$ of the window elevating relay 202, the movable contact is connected to one end of the window opening and closing motor 211, one fixed contact is connected to the positive polarity side of the car power supply 213 and the other fixed contact is connected to the ground. Upon normal operation, the movable contact is fixed to the other fixed contact side. In the contact $204_1$ of the window lowering relay 204, the movable contact is connected to the other end of the window opening and closing motor 211, one fixed contact is connected to the positive polarity side of the car power supply 213, and the other fixed contact is connected to the ground. Upon normal operation, the movable contact is connected to the other fixed contact side. In the car power supply 213, the positive polarity side is connected to the port F of the control integrated circuit 212, and the negative polarity side is connected to the ground.

The waterproof power window device according to the fifth embodiment is operated as follows.

When a car driver or the like operates the window elevating switch 201, its movable contact is switched from the illustrated normally-close fixed contact to the normally-open fixed contact to supply the voltage of the car power supply 213 through the switched window elevating switch 201, the third reverse current protection diode 209, the first reverse current protection diode 207, the window elevating relay 202 and the window lowering switch 203 whose movable contact is switched to the illustrated normally-close fixed contact side to the ground point, thereby driving the window elevating relay 202. At that time, in the contact $202_1$ of the window elevating relay 202, the movable contact is switched from the illustrated connected state to the revere connected state to supply the voltage of the car power supply 213 to the window opening and closing motor 211, thereby resulting in the window opening and closing motor 211 being rotated in one direction. This window opening and closing motor 211 is rotated in one direction, whereby the window is elevated to close the window. Then, when the operation of the window elevating switch 201 is stopped, its movable contact is switched to the illustrated normally-close fixed contact side and the voltage of the car power supply 213 is blocked by the window elevating switch 201 to thereby stop the driving of the window elevating relay 202. Thus, the rotation of the window opening and closing motor 211 is stopped and the elevation of the window is stopped, thereby resulting in the window being held at that position.

On the other hand, when the car driver or the like operates the window lowering switch 203, its movable contact is switched from the illustrated normally-close fixed side to the normally-open fixed contact side to supply the voltage of the car power supply 213 through the switched window lowering switch 203, the fourth reverse current protection diode 210 and the window lowering relay 204 to the ground point, thereby resulting in the window lowering relay 204 being driven. At that time, in the contact $204_1$ of the window lowering relay 204, the movable contact is switched from the illustrated connection state to the reverse connection state, whereby the voltage of the car power supply 213 is supplied to the window opening and closing motor 211, thereby resulting in the window opening and closing motor 211 being rotated in the other direction. When this window opening and closing motor 211 is rotated in the other direction, the window is lowered to open the window. Then, when the operation of the window lowering switch 203 is stopped, its movable contact is switched to the illustrated normally-close fixed contact side and the voltage of the car power supply 213 is blocked by the window lowering switch 203, whereby the driving of the window lowering relay 204 is stopped. Thus, the rotation of the window opening and closing motor 211 is stopped and the lowering of the window is stopped, thereby resulting in the window being held at that position.

Also, the operation executed when the car driver or the like operates the automatic window elevating switch 205 or the automatic window lowering switch 206 is operated may be easily understood from the fifth embodiment and need not be described.

Further, under the condition that the window of the car is completely closed or nearly completely closed, if the car falls in the water due to some cause, then the waterproof power window device according to the fifth embodiment attached to the inside of the door also is flooded by the water. In this case, the window elevating switch 201, the window lowering switch 203, the automatic window elevating switch 205 and the automatic window lowering switch 206 are flooded by the water. When the water enters the window elevating switch 201 and the window lowering switch 203, it becomes equivalent that a leakage resistor based on water having a relatively small resistance value is connected between the movable contact and the normally-open fixed contact as described above. However, since the normally-close fixed contact of the window elevating switch 201 is grounded through the second reverse current protection diode 208 and the window lowering relay 204 and is connected to the third reverse current protection diode 209, the first reverse current protection diode 207, the window elevating relay 202 and the movable contact of the window lowering switch 203. Since the normally-close fixed contact of the window lowering switch 203 is connected to the ground, the voltage of the car power supply 213 applied to the. window elevating switch 201 is applied to the window elevating relay 202 and the window lowering relay 204 simultaneously. As a result, since the contact $202_1$ of the window elevating relay 202 and the contact $204_1$ of the window lowering relay 204 are connected in the states opposite to the illustrated states, the window opening and closing motor 211 is not rotated.

Under such state, when the car driver or the like operates the window lowering switch 203, the contact of the window lowering switch 203 is switched from the normally-close fixed contact side to the normally-open fixed contact side to place the leakage resistor based on the water connected between the normally-open fixed contact and the movable contact in the short-circuit state by the switching of the contact. At the same time, the portion between the normally-close fixed contact side and the movable contact is changed from the short-circuit state to the opened state. Thus, this time the leakage resistor based on the water is connected to the portion between the normally-close fixed contact side and the movable contact. As a result, the voltage of the car power supply 213 is directly supplied through the short-circuited window lowering switch 203 and the fourth reverse current protection diode 210 to the window lowering relay 204. On the other hand, the voltage of the car power supply 213 is supplied to both ends of the window elevating relay 202 so that the driving of the window elevating relay 202 is released. As a result, the contact $204_1$ of the window lowering relay 204 maintains the connection state opposite to the illustrated connection state and the contact $202_1$ of the window elevating relay 202 is returned to the illustrated connection state. Consequently, the window opening and closing motor 211 is rotated in the other direction. Thus, since the window is lowered to open the window, the car driver or the like may escape from the flooded car through the opened window.

As described above, according to the waterproof power window device of the fifth embodiment, when the car falls in the water so that the waterproof power window device is flooded by the water and the water enters the window lowering switch 203, it is possible to open the window by operating the window lowering switch 203.

Figure 6:
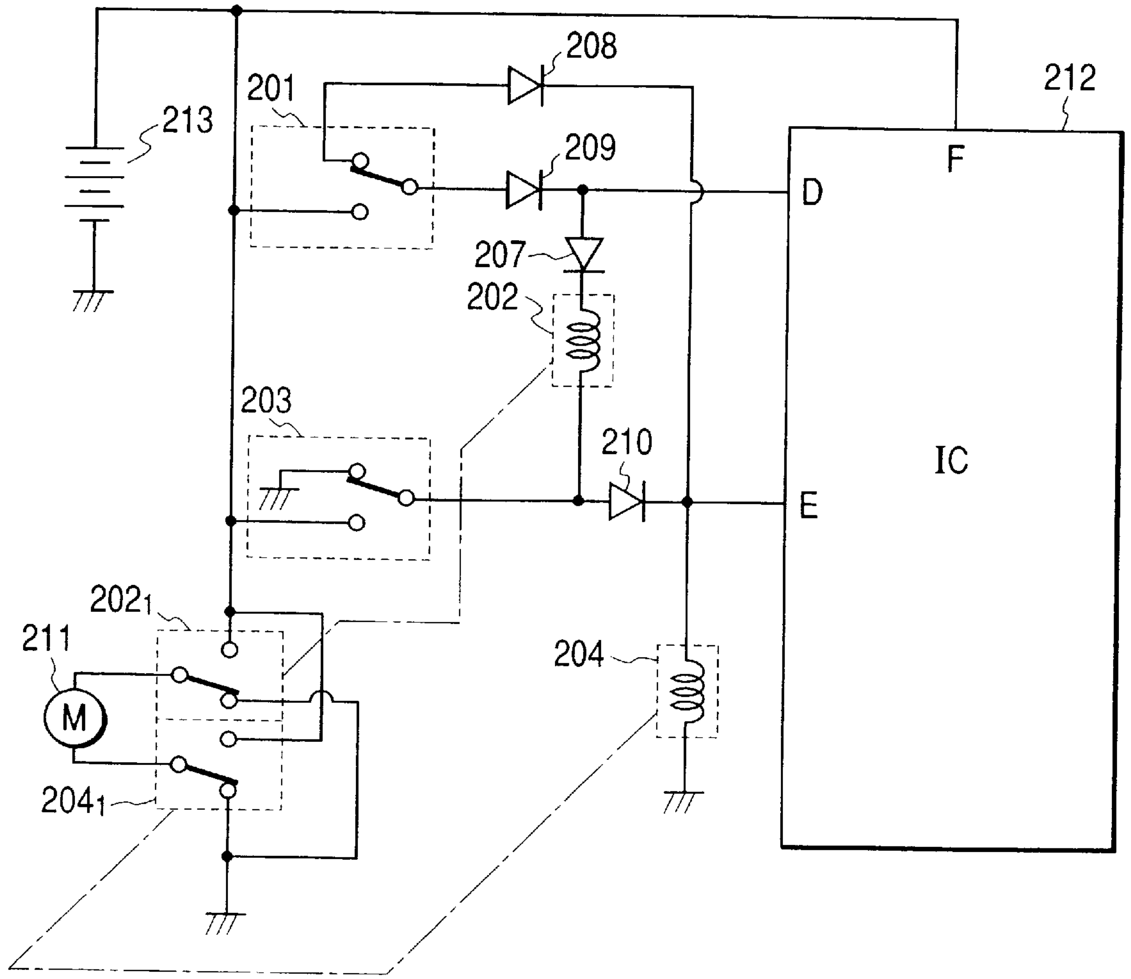
FIG. 6 is a circuit diagram showing a main portion of a waterproof power window device according to a sixth embodiment of the present invention.
Figure 7:
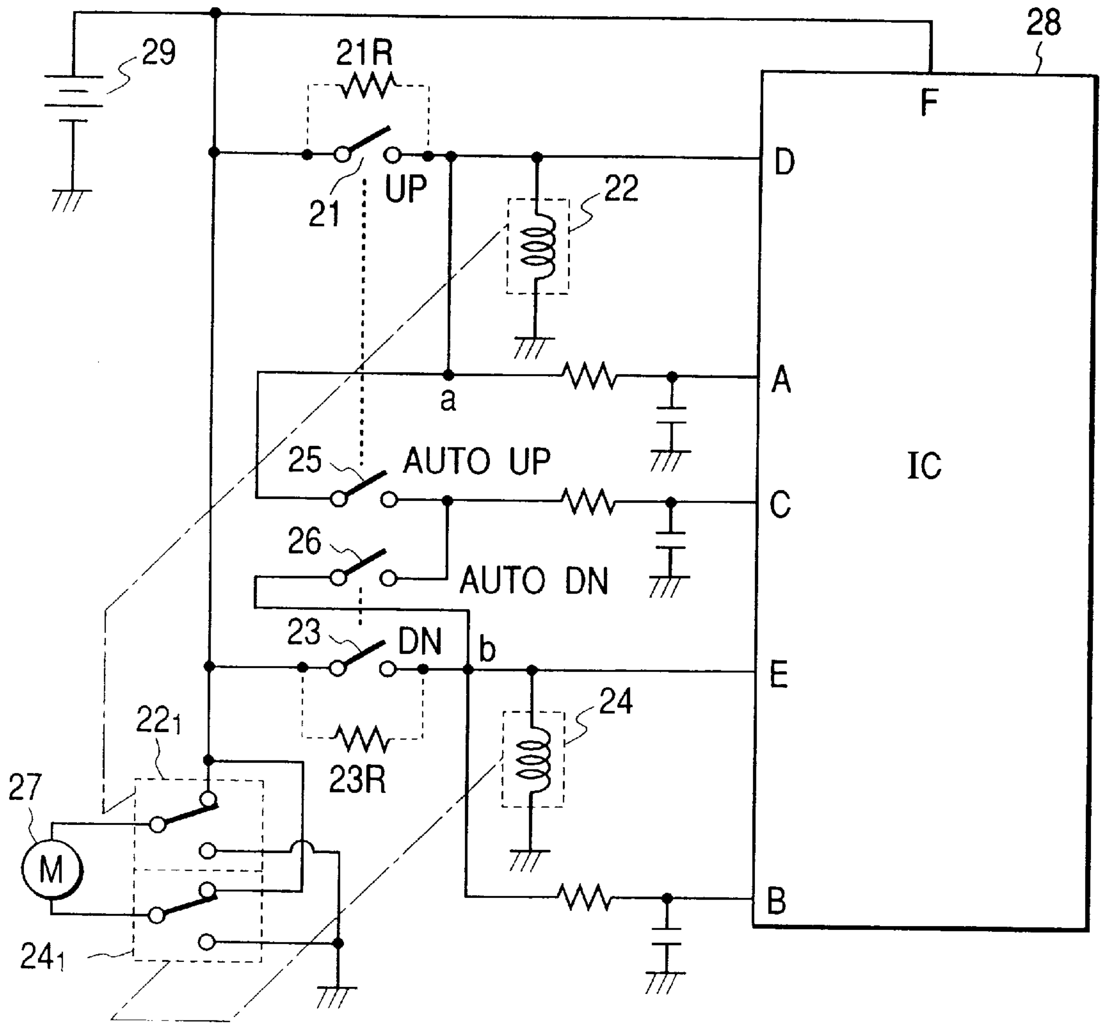
FIG. 7 PRIOR ART
FIG. 7 is a circuit diagram showing an example of a main portion of a well-known power window device.

FIG. 6 is a circuit diagram showing a main portion of a waterproof power window device according to a sixth embodiment of the present invention.

In FIG. 6, elements and parts identical to those of FIG. 5 are marked with the same reference numerals.

In the sixth embodiment, the automatic window elevating switch 205 and the automatic window lowering switch 206 are removed from the fifth embodiment. The sixth embodiment is the same as the fifth embodiment excepting that the automatic window elevating switch 205 and the automatic window lowering switch 206 are not connected. The arrangement of the sixth embodiment will not be described any more.

The operation upon normal state in the operation of the sixth embodiment (operation executed when the waterproof power window device is not flooded by the water) is almost the same as the operation upon normal state of the fifth embodiment excepting that the automatic operation using the automatic window elevating switch 205 and the automatic window lowering switch 206 cannot be executed. Therefore, the operation upon normal state in the sixth embodiment will not be described any more.

Further, the operation in the flooded state in the operation of the sixth embodiment (operation executed when the waterproof power window device is flooded by the water) is exactly the same as the operation in the flooded state in the fifth embodiment. In addition, action and effects achieved by the sixth embodiment are the same as those achieved by the fifth embodiment because the operation in the flooded state is the same as the operation in the fifth embodiment. Therefore, the operation in the flooded state of the sixth embodiment and the action and effects achieved by the sixth embodiment will not be described any more.

While the waterproof power window device is obtained by using a waterproof coating as described above, the waterproof treatment means of the waterproof power window device according to the present invention is not limited to a waterproof power window device using the waterproof coating material, and it is needless to say that other waterproof treatment means having a waterproof function equivalent to that of the waterproof coating material may be used.

Further, a fragmentary waterproof coating material may be used. Furthermore, if other portions than the lands connecting the assemblies in the circuit on the printed circuit board surface are coated with an ordinary insulating coating material and a distance between the lands is not extremely narrow, then the present invention may achieve sufficient effects.

As described above, according to the present invention, since the first switch (window elevating switch) and the second switch (window lowering switch) are each comprised of a one-circuit two-contact switch, the fixed contact which is switched when it is not operated is connected to the ground so as not to be affected by the influence of the leakage between the contacts when the device is flooded, the second relay is energized by operating the second switch, the first relay is de-energized with application of the inverse voltage and only the second relay is driven reliably, the window may be reliably opened by operating the second switch.

Further, according to the present invention, since the waterproof power window device includes the first series circuit comprised of the first switch (window elevating switch) composed of the one-circuit two-contact switch and the first relay (window elevating relay) and the second series circuit comprised of the second switch (window lowering switch) of one-circuit two-contact and the second relay (window lowering relay), in the first series circuit, the fixed contact which is switched when the first switch is not operated is connected to the junction between the second switch and the second relay, the fixed contact which is switched when the first switch is operated is connected to the car power supply, the other end of the first relay is connected to the junction between the second switch and the second relay, in the second series circuit, the fixed contact which is switched when the second switch is operated is connected to the ground point, the fixed contact which is switched when the second switch is operated is connected to the car power supply and the other end of the second relay is connected to the ground, when the car falls in the water and flooded by the water and the first switch is placed in the leakage state, the voltage of the car power supply is applied to both of the first relay and the second relay to place the motor in the stationary state. Then, since the second relay is energized by operating the second switch and the first relay is de-energized with application of the inverse voltage, the window may be reliably opened by operating the second switch.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A waterproof power window device comprising:

a first series circuit containing a first one-circuit two-contact switch and a first relay, said first one-circuit two-contact switch switchable between ground and a car power supply; and a second series circuit containing a second one-circuit two-contact switch and a second relay, said second one-circuit two-contact switch switchable between ground and a car power supply; and wherein during operation of said first switch, said first relay is energized such that a corresponding first contact is switched and a motor is rotated in one direction elevating a window, and during operation of said second switch, said second relay is energized such that a corresponding second contact is switched and said motor is rotated in an opposite direction lowering said window, an end of said first series circuit is connected to a junction between said second switch and said second relay, an end of said second series circuit is connected to a junction between said first switch and said first relay, and said first switch and said second switch are connected with said car power supply during operation and connected with ground during non-operation, thus allowing normal operation of said waterproof power window device when said waterproof power window device is submerged in water.

2. A waterproof power window device according to claim 1, further comprising:

an automatic first switch operable in unison with said first switch; and an automatic second switch operable in unison with said second switch, said automatic first switch and said automatic second switch connected in parallel and connected between said car power supply and a control integrated circuit;

wherein, after said automatic first switch is operated, said control integrated circuit generates a voltage and said first relay is energized by said voltage such that said motor is rotated in said one direction elevating a window and after said automatic second switch is operated, said control integrated circuit generates said voltage and said second relay is energized by said voltage such that said motor is rotated in the opposite direction lowering said window.

3. A waterproof power window device comprising:

a first series circuit containing a first one-circuit two-contact switch and a first relay, said first one-circuit two-contact switch switchable between ground and a car power supply; and a second series circuit containing a second one-circuit two-contact switch and a second relay, said second one-circuit two-contact switch switchable between ground and a car power supply; and wherein during operation of said first switch, said second relay is energized such that a corresponding second contact is switched and a motor is rotated in one direction elevating a window, and during operation of said second switch, said first relay is energized such that a corresponding first contact is switched and said motor is rotated in an opposite direction lowering said window, an end of said first series circuit is connected to a junction between said second switch and said second relay, an end of said second series circuit is connected to a junction between said first switch and said first relay, and said first switch and said second switch are connected with said car power supply during non-operation and connected with ground during operation, thus allowing normal operation of said waterproof power window device when said waterproof power window device is submerged in water.

4. A waterproof power window device according to claim 3, further comprising:

an automatic first switch operable in unison with said first switch; and an automatic second switch operable in unison with said second switch, said automatic first switch and said automatic second switch connected in parallel and connected between said car power supply and a control integrated circuit;

wherein, after said automatic first switch is operated, said control integrated circuit generates a voltage and said first relay is energized by said voltage such that said motor is rotated in said one direction elevating a window and after said automatic second switch is operated, said control integrated circuit generates said voltage and said second relay is energized by said voltage such that said motor is rotated in the opposite direction lowering said window.

5. A waterproof power window device comprising:

a first series circuit comprised of a first switch formed of a one-circuit two-contact switch and a first relay; and a second series circuit comprised of a second switch formed of a one-circuit two-contact switch and a second relay, wherein said first series circuit is connected with a first junction between said second switch and said second relay when said first switch is not operated and is connected with a car power supply when said first switch is operated, an end of said first relay is connected with a second junction between said second switch and said second relay, said second series circuit is connected with to the ground when said second switch is not operated and is connected with said car power supply when said second switch is operated, when said first switch is operated an end of said second relay is connected to the ground and said first relay is energized such that a corresponding first contact is switched and a motor is rotated in one direction elevating a window and when said second switch is operated said second relay is energized such that a corresponding second contact is switched and said motor is rotated in the opposite direction lowering said window, thus allowing normal operation of said waterproof power window device when said waterproof power window device is submerged in water.

6. A waterproof power window device according to claim 5, further comprising:

an automatic first switch operable in unison with said first switch; and an automatic second switch operable in unison with said second switch, said automatic first switch and said automatic second switch connected in parallel and connected between said car power supply and a control integrated circuit;

wherein, after said automatic first switch is operated, said control integrated circuit generates a voltage and said first relay is energized by said voltage such that said motor is rotated in said one direction elevating a window and after said automatic second switch is operated, said control integrated circuit generates said voltage and said second relay is energized by said voltage such that said motor is rotated in the opposite direction lowering said window.

* * * * *